No. 707,771. Patented Aug. 26, 1902.
L. P. GRAHAM.
CORN PLANTER.
(Application filed July 8, 1902.)
(No Model.)
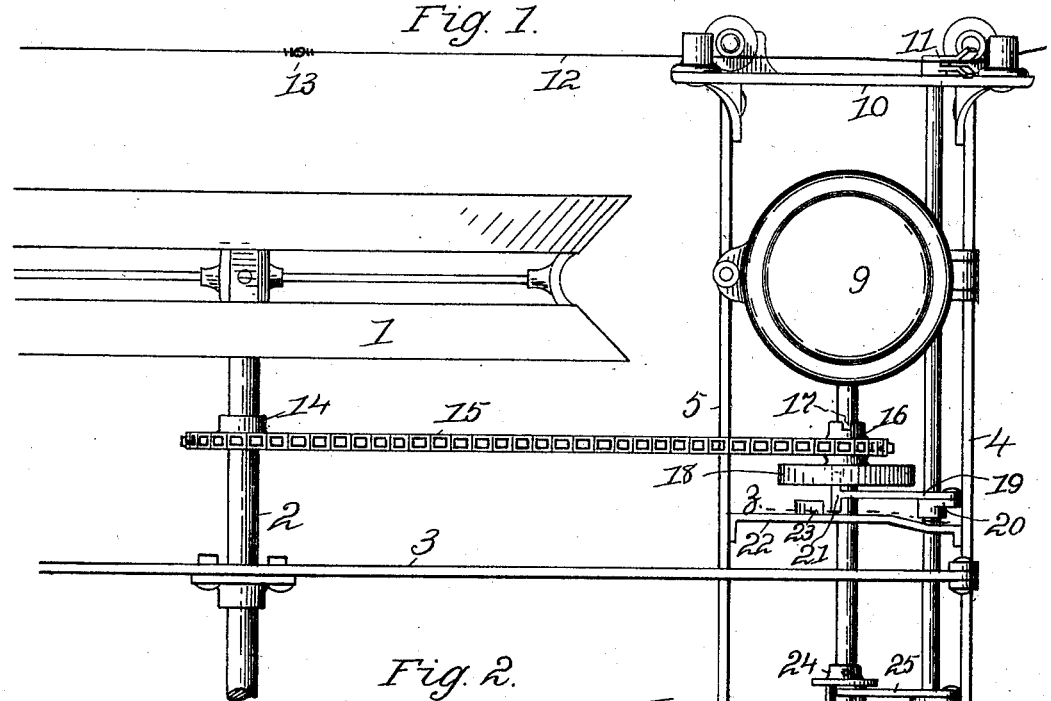
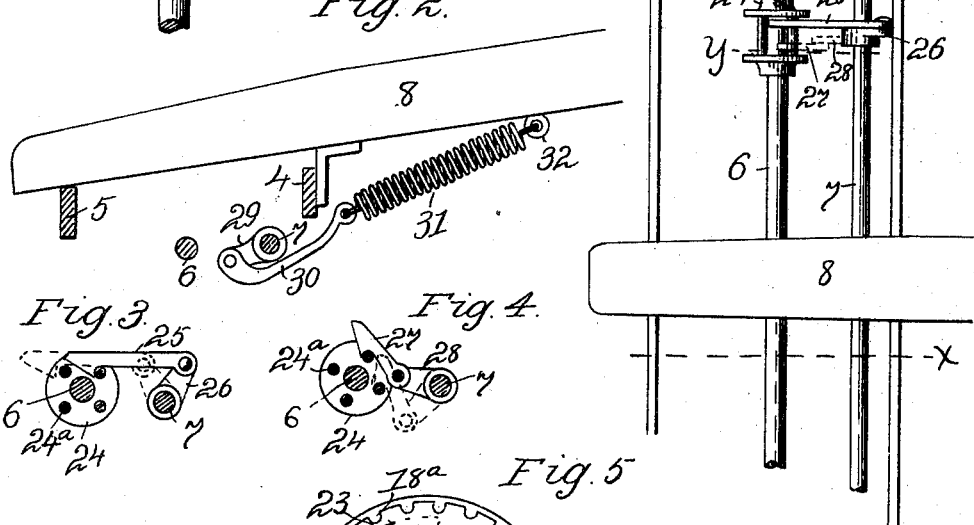
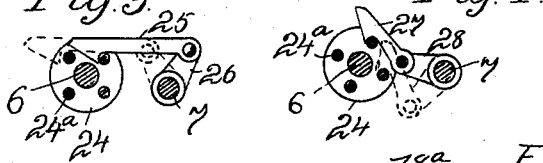
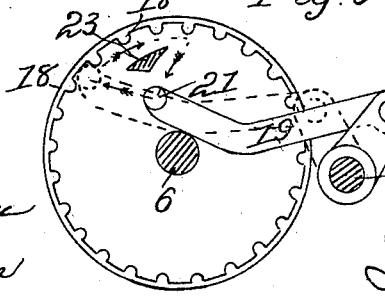
Witnesses
Nora Graham
Ina C. Graham
Inventor.
Levi P. Graham

UNITED STATES PATENT OFFICE.

LEVI P. GRAHAM, OF DECATUR, ILLINOIS.

CORN-PLANTER.

SPECIFICATION forming part of Letters Patent No. 707,771, dated August 26, 1902.

Application filed July 8, 1902. Serial No. 114,813. (No model.)

*To all whom it may concern:*

Be it known that I, LEVI P. GRAHAM, of the city of Decatur, county of Macon and State of Illinois, have invented certain new and useful Improvements in Corn-Planters, of which the following is a specification.

This invention relates to means for actuating the dropping mechanism of corn-planters; and the objects, utility, and mode of operation will be apparent from the subjoined description. The invention is exemplified in the structure hereinafter described, and it is defined in the appended claims.

In the drawings forming part of this specification, Figure 1 is a plan of so much of a planter as is needed to explain my invention. Fig. 2 is a section on line X in Fig. 1, showing the means preferably employed to store force for doing the work required to be done by the check-row shaft. Fig. 3 is a section on line Y in Fig. 1, showing means for actuating the drill-shaft from the check-row shaft. Fig. 4 is a section on line Y in Fig. 1, showing means for driving the drill-shaft from the check-row shaft in a manner somewhat different from the operation of the means shown in Fig. 3. Fig. 5 is a section on line Z in Fig. 1, showing the means that is preferably employed to rock the check-row shaft forward and develop motion which is eventually transmitted to the drill-shaft from the check-row shaft.

A covering-wheel of a planter is shown at 1, an axle-shaft at 2, and a side bar of the rear frame at 3. The cross-bars of the front frame are shown at 4 and 5. The shaft used to drive the mechanism in the seedboxes, commonly called the "drill-shaft," is shown at 6, and the check-row shaft is shown at 7.
The rear end of the tongue is shown at 8. One of the seedboxes is shown at 9. At 10 is shown a check-row head. A forked lever 11 is secured to an end of the check-row shaft in line with the guide-pulleys of the check-row head, and a check-row wire 12, having knots, as 13, is run through the check-row head and the forked lever. The check-row shaft connects with second drop mechanism, (not shown,) and the drill-shaft is suitably geared to the seed-wheels of the seedboxes. With the details hereinbefore described my present invention has nothing to do.

A sprocket-wheel 14 on axle-shaft 1 is rotated by motion derived from the covering-wheel. A sprocket-wheel 16 is journaled loosely on the drill-shaft while the planter is used to plant in check-rows, and a chain 15 transmits motion from the sprocket-wheel 14 to the sprocket-wheel 16. A ratchet-wheel 18 is made integral with wheel 16 or attached thereto. The face of the ratchet-wheel 18 is recessed, and the teeth 18ª are presented inward from the rim of the wheel. An arm 20 is fastened to the check-row shaft adjacent to the ratchet-wheel 18, and a pawl 19 is pivotally secured to the swinging end of the arm 20. A cross-bar 21 is formed on the free end of pawl 19, and one end of the cross-bar extends into the recessed face of the ratchet-wheel, while the other end projects in the opposite direction. A bracket 22 has a guide-cam 23, which projects above the outer extension of cross-bar 21 when the pawl is at rest and holds the pawl in contact with the teeth of the ratchet-wheel during an operative movement of the pawl.

A ratchet-wheel 24, preferably of the lantern-wheel type, is fastened on the drill-shaft. An arm 26 is fastened to the check-row shaft opposite the lantern-wheel, and a pawl 25 is pivotally connected with the swinging end of arm 26 in position to engage the rods 24ª of the lantern-wheel and rock the wheel and the drill-shaft forward as the check-row shaft is forced forward by pawl 19, as shown in Fig. 3, or an arm 28 may be attached to the check-row shaft and provided with a pawl 27, as shown in dotted lines in Fig. 1, and in that case the drill-shaft will be moved forward as the check-row shaft rocks operatively backward, as shown in Fig. 4.

An arm 29 (seen only in Fig. 2) is fastened to the check-row shaft beneath the tongue as a matter of preference. A bent link 30 is connected at one end with the swinging end of arm 29, and a spring 31 connects at one end with the bent link and at the other end with an eye 32, secured to the tongue. When the check-row shaft rocks forward, the spring pulls lengthwise of arm 29 and forms a dead-center lock. As soon as the lock is broken by a slight backward rock of the check-row shaft the spring contracts and completes the operative rock of the check-row shaft.

As the check-row shaft completes its backward rock the pawl 19 engages ratchet-wheel 18, as shown in dotted lines in Fig. 5, and the motion of the covering-wheel is then transmitted through the chain, the sprocket-wheel 16, the ratchet-wheel 18, the pawl 19, and the arm 20 to the rock-shaft 7. When the rock-shaft completes it forward rock, the cross-bar of the pawl rides clear of the guide-cam 23 and the pawl drops from contact with the teeth of the ratchet-wheel.

If the pawl 25 is used in connection with the lantern-wheel, the drill-shaft will be rocked forward as the check-row shaft rocks forward; but if pawl 27 is used the drill-shaft will be carried forward as the check-row shaft rocks backward. In the one case the motion of the check-row shaft is transmitted at once to the drill-shaft and in the other case force is stored in the spring while the rock-shaft is rocking forward and held until the rock-shaft starts to rock backward. In both cases the entire work of actuating the planter mechanism, second drops as well as first drops, is put onto the covering-wheel, to be developed by the pull of the team; but the use of pawl 25 is thought to be preferable, for the reason that it gives longer slower movements to the drill-shaft and to the seed-wheels.

The drill-shaft rotates intermittently in one direction while planting in check-rows, and the check-row shaft rocks backward and forward when in use. I prefer to gear the seed-wheels to the drill-shaft, so that the wheels will turn at the same speed as the shaft, and to give the sprocket-wheel 16 a little more than a one-fourth rotation while the planter is traveling between cross-rows, but the timing may be varied.

The general idea of storing force to actuate the planting mechanism is broadly covered in claim 20 of Patent No. 680,326, granted to me August 13, 1901, and the ratchet movement used to transmit motion from the sprocket-wheel to the check-row shaft is covered in claims 8 and 9 of the same patent. In my application for patent filed June 30, 1902, Serial No. 113,847, I have described means for transmitting motion from the drill-shaft to the check-row shaft; but the present invention is distinguishable from the prior art in that the motion of the covering-wheel goes first to the check-row shaft and from there to the drill-shaft and in that the drill-shaft may be actuated by either the forward rock or the backward rock of the check-row shaft.

When the planter is used as a drill, the sprocket-wheel is fastened onto the drill-shaft and the check-row shaft is not used. Various mechanical appliances are readily available for quickly and easily connecting the wheel with the shaft, and a simple expedient would be to insert a pin into the shaft through the notch 17 in the hub of the wheel. The check-row shaft requires no manipulation to convert the planter into a drill. The pawl 19 is forced positively into contact with the ratchet-wheel 18. The first motion of the engaging end of the pawl is upward and around the wheel, which eases the starting of the check-row shaft, and as there is no resistance whatever to the force imparted to the pawl when the check-row shaft completes its forward rock the pawl drops from contact with the ratchet-wheel without concussion or jar.

I claim—

1. In a planter, the combination of a covering-wheel, a rotating drill-shaft, a rocking check-row shaft, a wheel journaled on the drill-shaft, means for transmitting motion from the covering-wheel to the wheel on the drill-shaft, means for rocking the check-row shaft backward, means actuated by the wheel on the drill-shaft for rocking the check-row shaft forward, and means for converting the rocking motion of the check-row shaft into intermittent rotary motion in the drill-shaft.

2. In a planter, the combination of a covering-wheel, a rotating drill-shaft, a rocking check-row shaft, a wheel journaled on the drill-shaft means for transmitting motion from the covering-wheel to the wheel on the drill-shaft, means for rocking the check-row shaft backward, means actuated by the wheel on the drill-shaft for rocking the check-row shaft forward, means for converting the rocking motion of the check-row shaft into intermittent rotary motion in the drill-shaft, an arm on the check-row shaft and a spring exerting stored force lengthwise of the arm while the check-row shaft is rocked forward.

In testimony whereof I sign my name in the presence of two subscribing witnesses.

LEVI P. GRAHAM.

Witnesses:
E. S. McDONALD,
ROSA VOELCKER.